(12) United States Patent
Marquis et al.

(10) Patent No.: US 12,455,032 B2
(45) Date of Patent: Oct. 28, 2025

(54) BLIND MATE FLUID COUPLING WITH MISALIGNMENT COMPENSATION

(71) Applicant: Parker-Hannifin Corporation, Cleveland, OH (US)

(72) Inventors: Timothy T. Marquis, Otsego, MN (US); Jason R. Koller, Eden Prairie, MN (US); Andrew J. Holst, Plymouth, MN (US); Leonard Nick, Rockford, MN (US)

(73) Assignee: Parker-Hannifin Corporation, Cleveland, OH (US)

( * ) Notice: Subject to any disclaimer, the term of this patent is extended or adjusted under 35 U.S.C. 154(b) by 48 days.

(21) Appl. No.: 18/501,262

(22) Filed: Nov. 3, 2023

(65) Prior Publication Data
US 2024/0175531 A1    May 30, 2024

Related U.S. Application Data

(60) Provisional application No. 63/385,121, filed on Nov. 28, 2022.

(51) Int. Cl.
*F16L 37/52* (2006.01)
*F16L 27/04* (2006.01)
*F16L 37/34* (2006.01)

(52) U.S. Cl.
CPC ............... *F16L 37/52* (2013.01); *F16L 27/04* (2013.01); *F16L 37/34* (2013.01)

(58) Field of Classification Search
CPC . F16L 37/34; F16L 37/32; F16L 29/04; F16L 37/52; F16L 37/50; F16L 27/04; F16L 27/02
See application file for complete search history.

(56) References Cited

U.S. PATENT DOCUMENTS

| | | | | |
|---|---|---|---|---|
| 3,420,497 A | * | 1/1969 | Wilcox | F16L 37/413 |
| | | | | 251/149.6 |
| 3,508,580 A | * | 4/1970 | Snyder, Jr. | F16L 37/50 |
| | | | | 137/614.04 |
| 3,645,294 A | * | 2/1972 | Allread | F16L 37/34 |
| | | | | 137/614 |
| 4,269,226 A | * | 5/1981 | Allread | F16L 55/1015 |
| | | | | 251/149.6 |

(Continued)

FOREIGN PATENT DOCUMENTS

| | | | | |
|---|---|---|---|---|
| DE | 4323758 A1 | * | 4/1994 | ............. F16L 37/23 |
| EP | 0547435 B1 | * | 7/1996 | |

(Continued)

*Primary Examiner* — David Colon-Morales
(74) *Attorney, Agent, or Firm* — Renner, Otto, Boisselle & Sklar, LLP

(57) ABSTRACT

A coupling member for a blind mate fluid coupling including a housing and a fluid connector configured to connect to a fluid conduit, the fluid connector being fixed in position relative to the housing. The coupling member further includes a valve body at least partially extending in the housing. The valve body can have an internal fluid passage that is fluidly connected to the fluid connector, wherein the valve body further has a spherical interface that interfaces with at least one of the housing or another coupling member for enabling angular misalignment between the coupling member and the another coupling member.

15 Claims, 9 Drawing Sheets

(56) References Cited

U.S. PATENT DOCUMENTS

| | | | | |
|---|---|---|---|---|
| 4,886,301 | A * | 12/1989 | Remsburg | F16L 37/56 285/39 |
| 5,181,689 | A * | 1/1993 | Makishima | F16L 27/026 137/614.04 |
| 5,322,330 | A * | 6/1994 | Remsburg | F16L 37/56 285/39 |
| 6,056,329 | A * | 5/2000 | Kitani | F16L 27/12 285/302 |
| 7,275,563 | B2 * | 10/2007 | Tiberghien | F16L 29/04 251/149.6 |
| 8,028,718 | B2 * | 10/2011 | Tiberghien | F16L 29/04 251/149.6 |
| 8,931,499 | B2 * | 1/2015 | Clever | F16L 27/04 137/614.04 |
| 9,351,428 | B2 * | 5/2016 | Eckberg | F16L 37/34 |
| 10,288,198 | B2 * | 5/2019 | Tiberghien | H05K 7/20272 |
| 10,514,121 | B2 * | 12/2019 | Wada | F16L 37/23 |
| 10,865,927 | B2 * | 12/2020 | Reinholdt | B64D 39/04 |
| 11,359,753 | B2 * | 6/2022 | Raad | F16L 37/52 |
| 11,746,942 | B2 * | 9/2023 | Durieux | F16L 37/56 251/149.6 |
| 11,815,214 | B2 * | 11/2023 | Nick | H05K 7/20781 |
| 12,173,826 | B2 * | 12/2024 | Shende | F16L 29/04 |
| 2005/0164538 | A1 | 7/2005 | Tiberghien et al. | |
| 2008/0122221 | A1 * | 5/2008 | Bridgewater | F16L 27/026 285/184 |
| 2010/0295293 | A1 * | 11/2010 | Healy | F16L 27/04 285/95 |
| 2015/0285418 | A1 * | 10/2015 | Rempert | F16L 41/18 285/412 |
| 2022/0349503 | A1 * | 11/2022 | Durieux | F16L 37/02 |

FOREIGN PATENT DOCUMENTS

| | | | |
|---|---|---|---|
| EP | 1852644 A2 | 11/2007 | |
| EP | 2020555 A1 * | 2/2009 | F16L 29/04 |
| WO | 2022031918 A1 | 2/2022 | |
| WO | WO-2022180569 A1 * | 9/2022 | F16L 27/04 |

* cited by examiner

BLIND MATE FLUID COUPLING WITH MISALIGNMENT COMPENSATION

RELATED APPLICATIONS

The present application claims priority to U.S. Provisional Application No. 63/385,121 filed on Nov. 28, 2022, the contents of which are incorporated here by reference.

TECHNICAL FIELD

The present invention relates to a blind mate fluid coupling with misalignment compensation functionality.

BACKGROUND

Fluid couplings are commonly used to connect fluid lines in a variety of applications. Often these couplings include a male member and a female member that are mated together for fluid connection between fluid lines of a system. The male member generally includes a projecting portion at one end for insertion into a receiving end of the female member. When the projecting portion of the male member is inserted into the receiving end of the female member, fluid flow may be established through flow passages in each of the coupling members. Typically, one or both of the coupling members include a valve member that is opened to permit fluid flow when the coupling members are fully-mated together, and that is closed to terminate fluid flow when the coupling members are disconnected.

One type of fluid coupling that is often used in the electronics industry for thermal management applications, for example, is a blind mate fluid coupling. Conventionally, each coupling member of a blind mate coupling is mounted on a plate or manifold, such as with one coupling member mounted in an electrical cabinet and the other coupling member mounted on a modularly removable rack or blade carrying electronics. The mating action between the coupling members of the blind mate coupling occurs via a sliding motion between the plate and manifold (e.g., cabinet and rack/blade) which can be accomplished without tools and without visually seeing the connection sequence. Typically, such blind mate couplings have minor self-aligning features which allows a small amount of misalignment between the coupling members when mating them together.

SUMMARY

One issue with conventional blind mate coupling designs is that the amount of misalignment allowed when mating the coupling members together may be insufficient for many applications. For example, a conventional blind mate coupling may allow up to only 1 mm of maximum radial misalignment and essentially zero angular misalignment between the coupling members. When trying to expand the use of such blind mate couplings into more broadly accepted applications, such as electronic data centers, the tolerances of the enclosures for these applications may not be as tightly controlled as more conventional or sophisticated applications. Therefore, more misalignment tolerance is needed in the mating between coupling members to maintain the current proven and economical manufacturing processes for such applications.

At least one aspect of the present disclosure provides a coupling member for a blind mate fluid coupling that includes a housing and a valve body at least partially contained in the housing, in which the valve body is angularly pivotable relative to the housing to account for angular misalignment between a first coupling member and a second coupling member. In exemplary embodiments, both coupling members of the blind mate fluid coupling are angularly pivotable to provide for radial misalignment compensation between the coupling members.

According to an aspect of the disclosure, a blind mate coupling comprises: a first coupling member including: a first housing; a first fluid connector configured to connect to a first fluid conduit, the first fluid connector being fixed in position relative to the first housing; and a first valve body at least partially extending in the first housing, wherein the first valve body has a first internal fluid passage that is fluidly connected to the fluid connector, wherein the first valve body is radially fixed with respect to the first housing, wherein the first valve body is angularly pivotable with respect to the first housing; and a second coupling member including; a second housing; a second fluid connector configured to connect to a second fluid conduit, the second fluid connector being fixed in position relative to the second housing; and a second valve body at least partially extending in the second housing, wherein the second valve body has a second internal fluid passage that is fluidly connected to the second fluid connector, wherein the second valve body is angularly pivotable with respect to the second housing for enabling angular misalignment between the first coupling member and the second coupling member or radially movable with respect to the second housing for enabling radial misalignment between the first coupling member and the second coupling member.

According to another aspect of the disclosure, a blind mate coupling comprises a first coupling member including: a first housing; a first fluid connector configured to connect to a first fluid conduit, the first fluid connector being fixed in position relative to the first housing; and a first valve body at least partially extending in the first housing, wherein the first valve body has a first internal fluid passage that is fluidly connected to the fluid connector, wherein the valve body further has a spherical interface; and a second coupling member including; a second housing; a second fluid connector configured to connect to a second fluid conduit, the second fluid connector being fixed in position relative to the second housing; and a second valve body at least partially extending in the second housing, wherein the second valve body has a second internal fluid passage that is fluidly connected to the second fluid connector, wherein the second valve body is movable relative to the second housing to move the second internal fluid passage relative to the second fluid connector, wherein the spherical interface of the first valve body interfaces with at least one of the housing or another coupling member for enabling angular misalignment between the first coupling member and the second coupling member.

According to a further aspect of the disclosure, a coupling member comprises a housing; a fluid connector configured to connect to a fluid conduit, the fluid connector being fixed in position relative to the housing; a valve body at least partially extending in the housing at a first end, wherein the valve body has an internal fluid passage that is fluidly connected to the fluid connector, wherein the valve body forms a receptacle configured to receive a forward end of another coupling member, wherein the valve body includes a spherical interface at a second end opposite the first end, wherein the spherical interface enables angular misalignment between the coupling member and the another coupling member.

According to yet another aspect of the disclosure, a coupling member for a blind mate fluid coupling comprises a housing; a fluid connector configured to connect to a fluid conduit, the fluid connector being fixed in position relative to the housing; and a valve body at least partially extending in the housing, wherein the valve body has an internal fluid passage that is fluidly connected to the fluid connector, wherein the valve body further has a spherical interface that interfaces with at least one of the housing or another coupling member for enabling angular misalignment between the coupling member and the another coupling member.

According to a yet further aspect of the disclosure, a blind mate fluid coupling comprises a first coupling member; a second coupling member; and an interface arrangement configured to fluidly couple the first coupling member and the second coupling member, wherein a first interface of the interface arrangement is configured to permit angular pivoting at the first interface, wherein a second interface of the interface arrangement is configured to permit angular pivoting at the second interface or to permit radial movement at the second interface to enable angular misalignment between the first coupling member and the second coupling member radial misalignment between the first coupling member and the second coupling member.

According to yet another aspect of the disclosure, a blind mate fluid coupling comprises a first coupling member comprising: a first housing; a first fluid connector configured to connect to a first fluid conduit, the first fluid connector being fixed in position relative to the housing; and a first valve body at least partially extending in the housing, wherein the first valve body has a first internal fluid passage that is fluidly connected to the fluid connector, wherein the first valve body is fixed within the first housing; a second coupling member comprising: a second housing; a second fluid connector configured to connect to a second fluid conduit, the second fluid connector being fixed in position relative to the housing; and a second valve body at least partially extending in the second housing, wherein the second valve body has a second internal fluid passage that is fluidly connected to the second fluid connector, wherein the second valve body further has a spherical interface that interfaces with the second housing for enabling angular misalignment between the first coupling member and the second coupling member, wherein the first valve body includes a spring-biased flat surface configured to engage a second spring-biased flat surface of the second valve body to fluidly couple the first coupling member and the second coupling member.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

DETAILED DESCRIPTION

Figure 1:
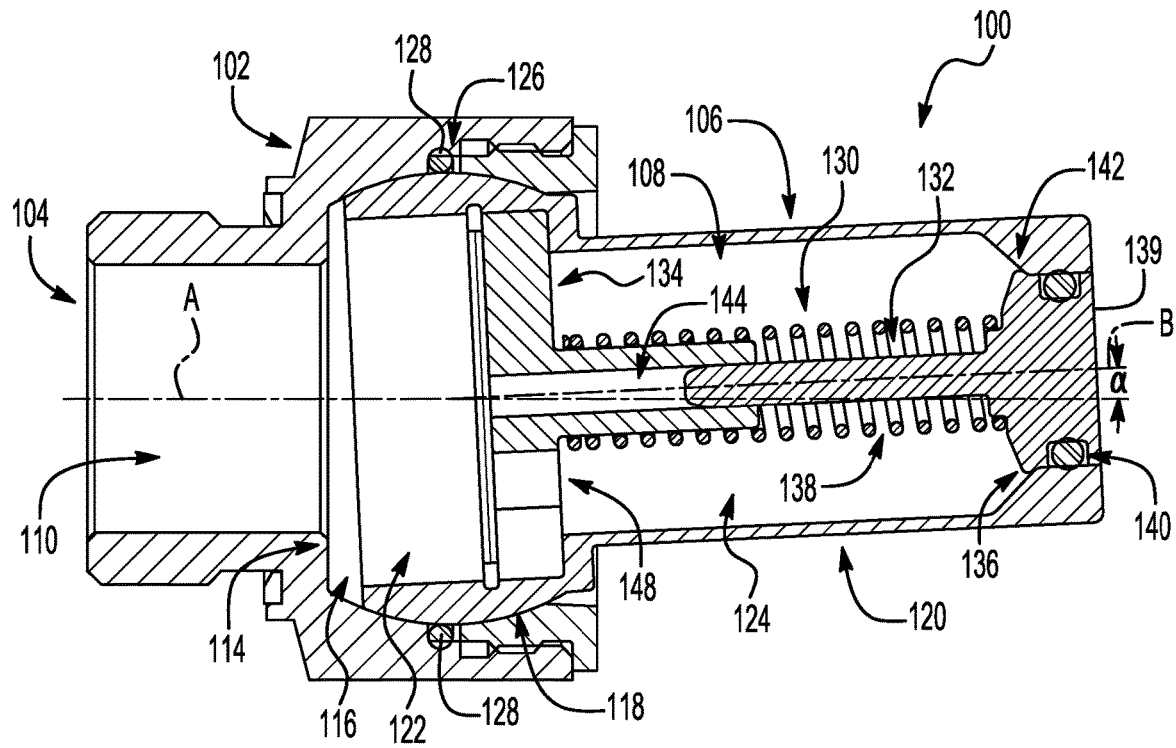
FIG. 1 illustrates an exemplary male coupling member of a blind mate fluid coupling.

Aspects of the present application pertain to a blind mate fluid coupling with misalignment compensation functionality which is now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details.

In reference to the disclosure herein, for purposes of convenience and clarity only, directional terms, such as, top, bottom, left, right, up, down, upper, lower, over, above, below, beneath, rear, and front, may be used. Such directional terms should not be construed to limit the scope of the features described herein in any manner. It is to be understood that embodiments presented herein are by way of example and not by way of limitation. The intent of the following detailed description, although discussing exemplary embodiments, is to be construed to cover all modifications, alternatives, and equivalents of the embodiments as may fall within the spirit and scope of the features described herein.

The term "about" as used herein refers to any value which lies within the range defined by a variation of up to ±10% of the stated value, for example, ±10%, ±9%, ±8%, ±7%, ±6%, ±5%, ±4%, ±3%, ±2%, ±1%, ±0.01%, or ±0.0% of the stated value, as well as values intervening such stated values.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something and is not intended to indicate a preference.

Turning to FIG. 1, a coupling member 100 for a blind mate fluid coupling is shown. The coupling member 100 includes a housing 102, a fluid connector 104 operatively coupled to the housing 102, and a valve body 106 movable with respect to the housing 102 to pivot an internal fluid passage 108 within the valve body 106 with respect to the fluid connector 104. Any suitable movement of the valve body 108 relative to the housing 102 is envisioned. In the embodiment illustrated in FIG. 1, the coupling member 100 is configured for angular pivoting of the valve body 106 relative to the housing 102, similar to a ball joint.

The fluid connector 104 can be configured to connect to a fluid conduit (omitted for clarity) of a system to place the fluid connector 104 and the system in fluid communication. In exemplary embodiments, the fluid connector 104 is fixed in position relative to the housing 102. The fixed positioning may be beneficial when the fluid conduit connected to the fluid connector 104 is a rigid conduit, such as a metal tube. The fluid connector 104 can be fixed to the housing 102 in any suitable manner, such as by threading, welding, or being unitary with the housing 102 (as shown). In the illustrated embodiment, the fluid connector 104 extends from a rearward portion of the housing 102 along a longitudinal axis A that is coaxial with a central axis of the housing 102. The fluid connector 104 can include an internal fluid passage 110 that is fluidly connected to the internal fluid passage 108 of the valve body 106.

The housing 102 can include structure for mounting to a platform of the system, such as a plate, drawer, rack, blade, or other suitable removable platform or structure carrying electronic components to be cooled via fluid flow established via the coupling member 100. Such electronic components may be used for PCIe expansion or other expansion interfaces carrying electronics (e.g., processors, memory storage devices, communications interfaces, etc.) that may be added to or removed from a computer environment, for example. The fluid flow may be established via a suitable fluid conduit of the cooling circuit (not shown), in which the fluid conduit may be a part of, or may be fluidly connected to, fluid equipment or machines, such as heat exchanger equipment (e.g., cold plate, etc.) that is in thermal communication with the electronics.

The illustrated housing 102 can movably retain a portion of the valve body 106. The housing 102 can have any suitable shape and/or size for movably retaining the valve body 106. In the illustrated embodiment, the housing 102 forms an internal chamber 114 with spherical surfaces that permit angular pivoting of the valve body 106 relative to the housing 102. The internal chamber 114 can be further configured to form an internal fluid passage 116 that is fluidly positioned between the internal fluid passage 110 of the fluid connector 104 and the internal fluid passage 108 of the valve body 106. In one embodiment, the internal fluid passage 116 of the internal chamber 114 is similar in shape and size to the internal fluid passage 110 of the fluid connector 104. In the illustrated embodiment, the internal fluid passage 116 is larger than the internal fluid passage 110 to permit angular pivoting of the valve body 106 while maintaining a fluid connection between the internal fluid passage 108 of the valve body and the internal fluid passage 110 of the fluid connector 104.

In the illustrated embodiment, a first portion 118 of the valve body 106 is retained within the internal chamber 114 while a second portion 120 extends outwardly from the housing 102. The first portion 118 can include a curved surface that slidably engages the curved surfaces of the internal chamber 114. Any suitable curved surface may be utilized, and in the illustrated embodiments the curved surface is a spherical surface. More particularly, by using spherical surfaces, the illustrated coupling member 100 permits angular displacement of the internal fluid passage of the valve body 106 relative to the internal fluid passage 110 of the fluid connector 104 while maintaining the fluid connection therebetween.

In another example, both coupling members of a blind mate coupling are configured to cooperate with each other to account for radial and/or angular offsets. More particularly, a valve body (e.g., valve body 106) of a coupling member (e.g., coupling member 100) is angularly pivotable within a corresponding housing (e.g., housing 102) while being fixed radially in the housing and the other valve body of the other coupling member is angularly pivotable with respect to the other housing of the other coupling member for enabling angular misalignment between the coupling member and/or the other coupling member is radially movable with respect to the other housing for enabling radial misalignment between the coupling member and the other coupling member. By providing such a combination of angular misalignment compensation from one member and angular misalignment compensation from the other member or angular misalignment compensation from one member and radial misalignment compensation from the other member, some of the embodiments described herein enable both radial and angular misalignment compensation in the combined blind mate fluid coupling, while also simplifying the design of each coupling member.

Although the coupling members in the illustrated embodiments are shown with spherical interfaces to provide such misalignment compensation, it is understood that the interfaces need not be spherical, but instead could be any surface or structure that accounts for radial and/or angular misalignment between the coupling members in a blind mate fluid coupling. For instance, instead of a spherical interface, the valve body 106 may include a short land that interacts with a corresponding indent in the housing 102 to permit pivoting or rotation of the valve body 106 relative to the housing 102. As will be described in detail below, in another example, the engagement ends of the coupling members in the blind mate fluid coupling are shaped to permit sliding with respect to each other while also allowing for fluid connection between the coupling members. In a further example, a cross-sectional size of the first portion 118 may be smaller than the cross-sectional size of the internal passage 114 to allow a large elastomeric piece(s) therebetween which allows the first portion 118 to rotate or pivot with respect to the internal passage 114.

The illustrated valve body 106 extends along a longitudinal axis B and forms the internal fluid passage 108, which is fluidly coupled to the fluid passage 110 of the fluid connector 104 via the internal fluid passage 116 of the internal chamber 114. As the valve body 106 pivots with respect to the housing 102, the longitudinal axis B angularly pivots with respect to the longitudinal axis A. For instance, any suitable angular pivoting of longitudinal axis B with respect to longitudinal axis A is envisioned, such as up and down pivoting as well into and out of the page.

Any range of pivoting of the longitudinal axis B with respect to longitudinal axis A is hereby envisioned and may depend on a shape of the housing 102, the valve body 106, and/or the like. For instance, a maximum pivoting range may be in a range from about 1 degree to about 180 degrees. In another example, a maximum pivoting range may be in a range from about 1 degree to about 90 degrees. In the illustrated embodiment, the longitudinal axis B is angularly pivoted 2.6 degrees with respect to longitudinal axis A and has a maximum pivoting range from about 1 degree to about 5 degrees.

The valve body 106 can have any suitable shape, size, configuration and/or the like as may be desired for a particular application. In the illustrated embodiment, the coupling member 100 is a male coupling member and the second portion 120 of the valve body 106 forms an elongated forward nose 120. The nose 120 can have any suitable cross-section, such as rectangular, triangular, ovular, and/or different portions of the nose 120 can have different cross-section. In the illustrated embodiment, the nose 120 is cylindrical with a circular cross-section along the length of the nose 120.

The illustrated internal fluid passage 108 of the valve body 106 includes a first portion 122 in the first portion 118 in the internal chamber 114 and a second portion 124 in the nose 120. The first portion 122 and the second portion 124 of the internal fluid passage 108 can be similar in shape and size or can vary, as illustrated. In the illustrated embodiment, the first portion 122 has a larger cross-section than the second portion 124 to permit angular pivoting of the valve body 108 while maintaining a fluid connection between the internal fluid passage 108 of the valve body and the internal fluid passage 110 of the fluid connector 104.

The coupling member 100 can further include a seal arrangement configured to seal an interface between the valve body 106 and the housing 102. The seal arrangement can be configured to permit angular displacement of the valve body 106 and the housing 102 while maintaining the seal on the interface. In the illustrated embodiment, the housing 102 includes a notch 126 and a sealing structure, here an O-ring 128, is inserted in the notch 126. The O-ring 128 circumscribes the internal chamber 114 and sealingly engages the valve body 106. In another embodiment, a different sealing structure may be employed, such as machining the valve body 106 and/or housing 102 to minimize space therebetween, the O-ring 128 sitting in a notch in the valve body 106, and/or the like. In another embodiment, the housing 102 can include a straight bore and two O-rings can be placed in the bore to allow the valve body to additionally rotate with respect to the housing 102.

The coupling member 100 also includes a valve member 130 configured to selectively open and close the internal fluid passage 108 of the valve body 106 via an opening at and end of the nose 120 of the valve body 106. The valve member 130 can have any suitable shape, size, and/or configuration for selectively opening and closing the internal fluid passage 108. In the illustrated embodiment, the valve member 130 is formed as a poppet that is slidably disposed within the valve body 106 to move between open and closed positions. The valve member 130 (e.g. poppet) includes a stem 132 that is slidably received in a guide structure 134, and is biased by a biasing member 138 away from the guide structure 134 and into the closed position (seen in FIG. 1). In the closed position, a head 139 of the valve member 130 engages a valve seat 136 in the nose 120. The head 139 includes a suitable seal 140 (e.g., an O-ring) for sealing against a sealing surface of the nose 120 in the closed position. The valve member 130 can include a shoulder 142 to engage the valve seat 136 to limit how far the valve member 130 can travel toward the opening at the end of the nose 120 in the closed position.

Any suitable biasing member 138 may be used to bias the valve member 130 toward the closed position. In the illustrated embodiment, the biasing member 138 includes a spring, such as a coil spring. The biasing member 138 may engage a spring seat inside the internal fluid passage 108. The spring seat can be formed by a portion of the valve body 106. In another embodiment, illustrated in FIG. 1, the spring seat is formed on the guide structure 134.

The guide structure 134 can include a sleeve portion 144 configured to removably receive a portion of the stem 132. The stem 132 and the guide structure 134 can be arranged such that a portion of the pin remains in the sleeve portion 144 even in the closed position, thus the stem 132 can remain aligned with the sleeve portion 144 even in the closed position. The guide structure 134 can further include attachment structure for securing the guide structure 134 within the valve body 106. Here the attachment structure includes a stop 146 arranged in the internal chamber 114 and the guide structure 134 includes a portion sandwiched between the stop 146 and the walls of the internal chamber 114. The attachment structure may include windows, for example, that form flow passages that permit flow through the valve body 106. The sandwiched portion of guide structure 134 can be shaped to limit/prevent the flow of fluid between the first portion 122 and the second portion 124 of the internal fluid passage 108 outside of an aperture 148 extending through the sandwiched portion.

Figure 2:
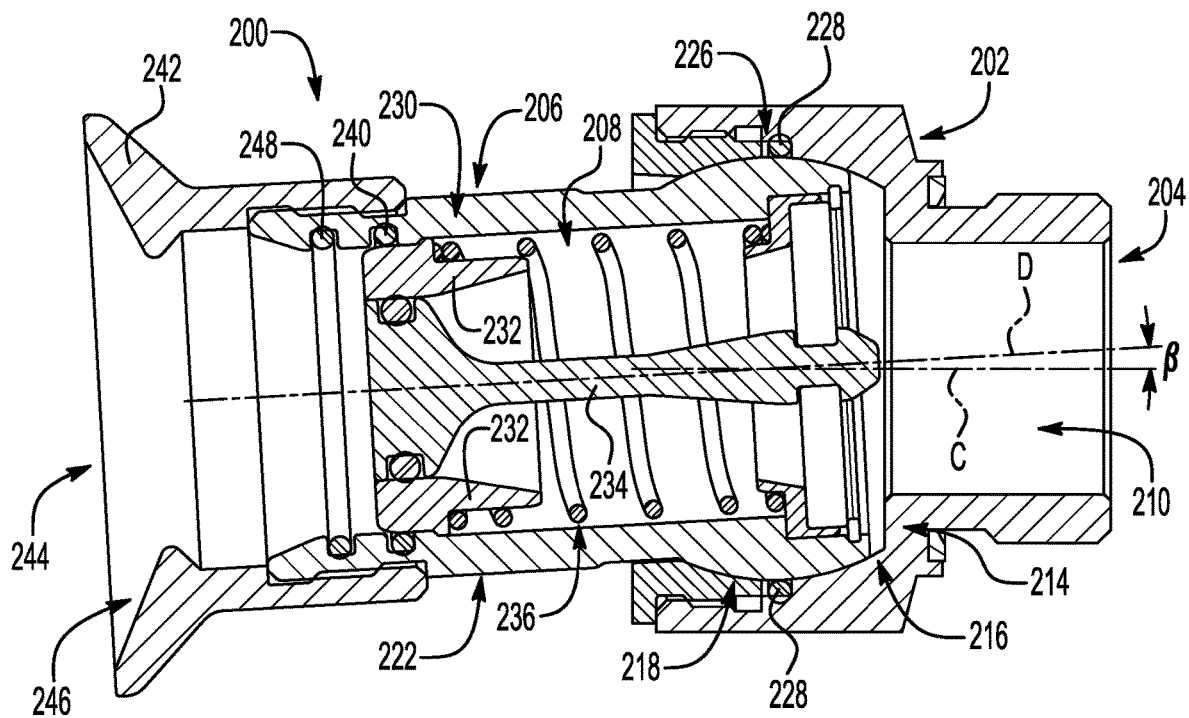
FIG. 2 illustrates an exemplary female coupling member of a blind mate fluid coupling.

Turning now to FIG. 2, illustrated is an embodiment of a coupling member 200 that includes some similar structure to coupling member 100, except the coupling member 200 is a female coupling member. As can be seen in FIG. 2, the coupling member 200 includes a housing 202, a fluid connector 204 operatively coupled to the housing 202, and a valve body 206 movable with respect to the housing 202 to pivot an internal fluid passage 208 within the valve body 206 with respect to the fluid connector 204. Like coupling member 100, the coupling member 200 is configured for angular pivoting of the valve body 206 relative to the housing 202.

The fluid connector 204 can be configured to connect to a fluid conduit (omitted for clarity) of a system to place the fluid connector 204 and the system in fluid communication. In exemplary embodiments, the fluid connector 204 is fixed in position relative to the housing 202. Similar to coupling member 100, the fluid connector 204 extends from a rearward portion of the housing 202 along a longitudinal axis C that is coaxial with a central axis of the housing 202. The fluid connector 204 can include an internal fluid passage 210 that is fluidly connected to the internal fluid passage 208 of the valve body 206.

The illustrated housing 202 can movably retain a portion of the valve body 206 and forms an internal chamber 214 with a spherical surface that permits angular pivoting of the valve body 206 relative to the housing 202. The internal chamber 214 can be further configured to form an internal fluid passage 216 that is fluidly positioned between the internal fluid passage 210 of the fluid connector 204 and the internal fluid passage 208 of the valve body 206. Like the coupling member 100, the internal fluid passage 216 is larger than the internal fluid passage 210 to permit angular pivoting of the valve body 208 while maintaining a fluid connection between the internal fluid passage 208 of the valve body 206 and the internal fluid passage 210 of the fluid connector 204.

A first portion 218 of the valve body 206 is retained within the internal chamber 214 while a second portion 220 extends outwardly from the housing 202. The first portion 218 includes a spherical surface that slidably engages the spherical surfaces of the internal chamber 214 to permit angular pivoting of the valve body 206 relative to the housing 202, similar to a ball joint. As noted above, however, any suitable structure that permits the valve body to pivot or rotate relative to the housing may be provided.

The illustrated valve body 206 extends along a longitudinal axis D and forms the internal fluid passage 208, which is fluidly coupled to the fluid passage 210 of the fluid connector 204 via the internal fluid passage 216. As the valve body 206 pivots with respect to the housing 202, the longitudinal axis D angularly pivots with respect to the longitudinal axis C. Similar to the description of coupling member 100, any range of pivoting of the longitudinal axis D with respect to longitudinal axis C is envisioned and the range may depend on a shape of the housing 202, the valve body 206, and/or the like. For instance, a maximum pivoting range may be less than 180 degrees. In another example, a maximum pivoting range may be less than 90 degrees. In the illustrated embodiment, the longitudinal axis D is angularly pivoted 3.2 degrees with respect to longitudinal axis C, with a maximum pivot angle being about 5-degrees, although greater or less of a maximum pivot angle may be provided.

As noted above, the coupling member 200 is a female coupling member where a first portion 218 is movably retained in the housing 202 and a second portion 220 extends from the housing 202 and forms a receptacle 222 (also referred to as a socket or receiver) that is configured to receive a corresponding forward portion of the male coupling member. The receptacle 222 can have any suitable cross-section, such as triangular, rectangular, ovular, and/or the like and different portions may have different portions may have similar cross-sections or can vary. In the illustrated embodiment, the receptacle 222 has a circular cross-section along the length of the receptacle 222.

Similar to coupling member 100, the coupling member 200 can further include a seal arrangement configured to seal an interface between the valve body 206 and the housing 202. In the illustrated embodiment, the housing 202 includes a notch 226 and a sealing structure, here an O-ring 228, is inserted in the notch 226.

The coupling member 200 can yet further include a valve member 230 to selectively open and close access to the internal fluid passage 208 of the valve body 206 when a male coupling member is fully coupled or decoupled, respectively, from the female coupling member 200. In the illustrated embodiment, the female valve member 230 is formed as a valve sleeve 232 that surrounds a fixed valve stem portion 234. A biasing member 236 surrounds the stem portion 234 and biases the valve sleeve 232 toward a closed position where the valve sleeve 232 engages with the stem portion 234 to closed the internal fluid passage 208.

The coupling member 200 can further include a sealing structure arranged at an interface between an end of the stem portion 234 and the valve sleeve 232 to seal the internal fluid passage 208 when the valve member 230 is in the closed position. In the illustrated embodiment, a notch is formed at the end of the stem portion 234 and an O-ring 240 is placed in the notch to sealingly engage the stem portion 234 and the valve sleeve 232 in the closed position. However, other sealing structure may be used, such as interlocking plastic alloy surfaces, and/or the like The coupling member 200 can yet further include a sealing structure arranged at an interface between the valve sleeve 232 and the valve body 206 to further seal the internal fluid passage 208 when the valve member 230 is in the closed position. In the illustrated embodiment, a notch is formed on an interior surface of the valve body 206 and an O-ring 240 is placed in the notch to sealingly engage the valve sleeve 232 and the valve body 206 in the closed position. Similar to the above sealing structure, different structures capable of sealing the interface between the valve sleeve 232 and the valve body 206 may be employed.

The coupling member 200 may further include a centering attachment 242 configured to guide a protrusion of a male coupling member (e.g., the nose 120 of coupling member 100) into a desirable position within the receptacle 222 of the valve body 206. The centering attachment 242 can have any suitable shape, size, and/or configuration and may depend on the shape of the protrusion of the male coupling member, the valve body 206, the valve member 230, and/or the like. For example, as described herein, the centering attachment 242 may use three internal diameters to gather and bring the two halves into alignment, similarly to the design of the bore described in U.S. Application No. 63/289,251, which is incorporated by reference.

In the illustrated embodiment, the centering attachment 242 includes an enlarged opening 244 with a cross-section larger than a cross-section of an entrance of the receptacle 222. The illustrated centering attachment 242 further includes a sloped surface 246 that is sloped inward from an edge of the enlarged opening 244 toward the receptacle 222 entrance to guide the protrusion into alignment with the entrance of the receptacle 222. The centering attachment 242 may have a frustoconical shape in the form of a funnel.

The centering attachment 242 can be attached to any suitable portion of the coupling member 200, such as the housing 202, valve body 206, the valve member 230, and/or the like. In the illustrated embodiment, the centering attachment 242 is attached to an exterior of the valve body 206. The valve body 206 and/or the centering attachment 242 can include structure to fix a position of the centering attachment 242 relative to the valve body 206, such as interlocking protrusions and indents (as illustrated), but other structure is conceivable, such as a clamp, bracket, and/or the like. Alternatively, the centering attachment 242 may be formed as a unitary structure along with housing 202, the valve body 206, the valve member 230, and/or the like.

The coupling member 200 may additionally include a sealing structure to seal an interface between a protrusion of a male coupling member and the coupling member 200 when the protrusion is inserted into the receptacle 222. Here, the valve body 206 includes a notch on an inner surface of the valve body 206 spaced forwardly from the notch for O-ring 240 between an entrance of the receptacle 222 and the O-ring 240. The notch can be shaped to receive and hold an O-ring 248 that sealing engages an interface between a protrusion of a male coupling member and the valve body 206.

Figure 3:
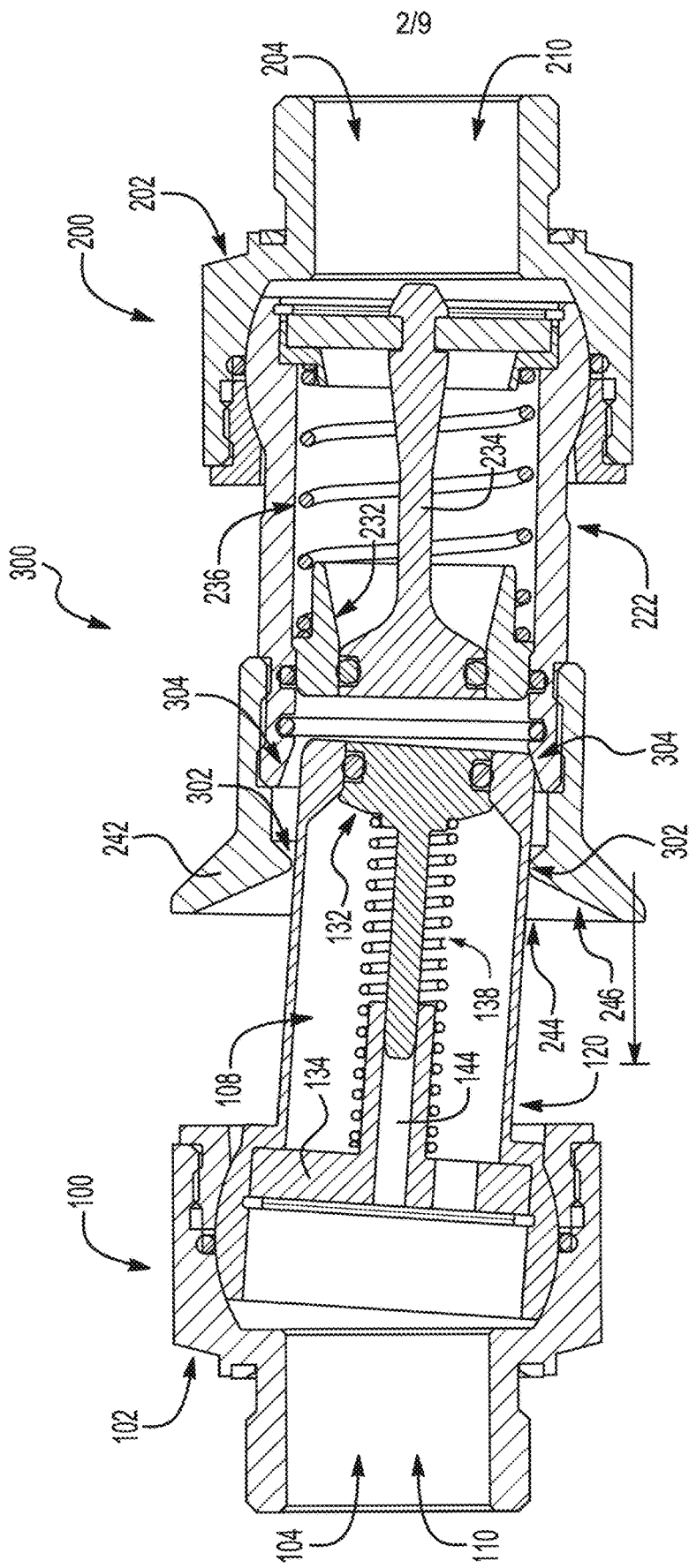
FIGS. 3-5 illustrate an exemplary process of fluidly coupling a blind mate coupling that includes the male coupling member of FIG. 1 and the female coupling member of FIG. 2 that are misaligned relative to each other.
Figure 4:
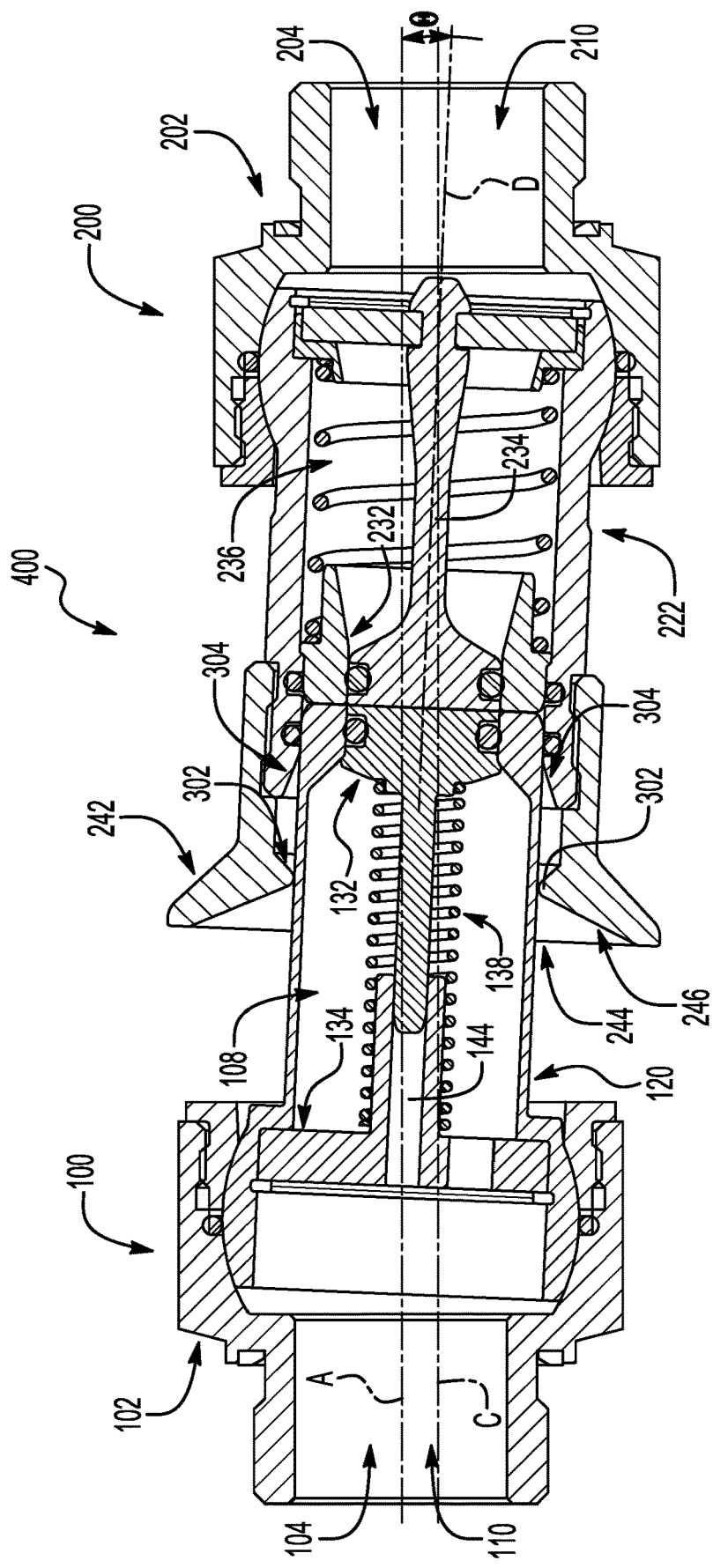
Figure 5:
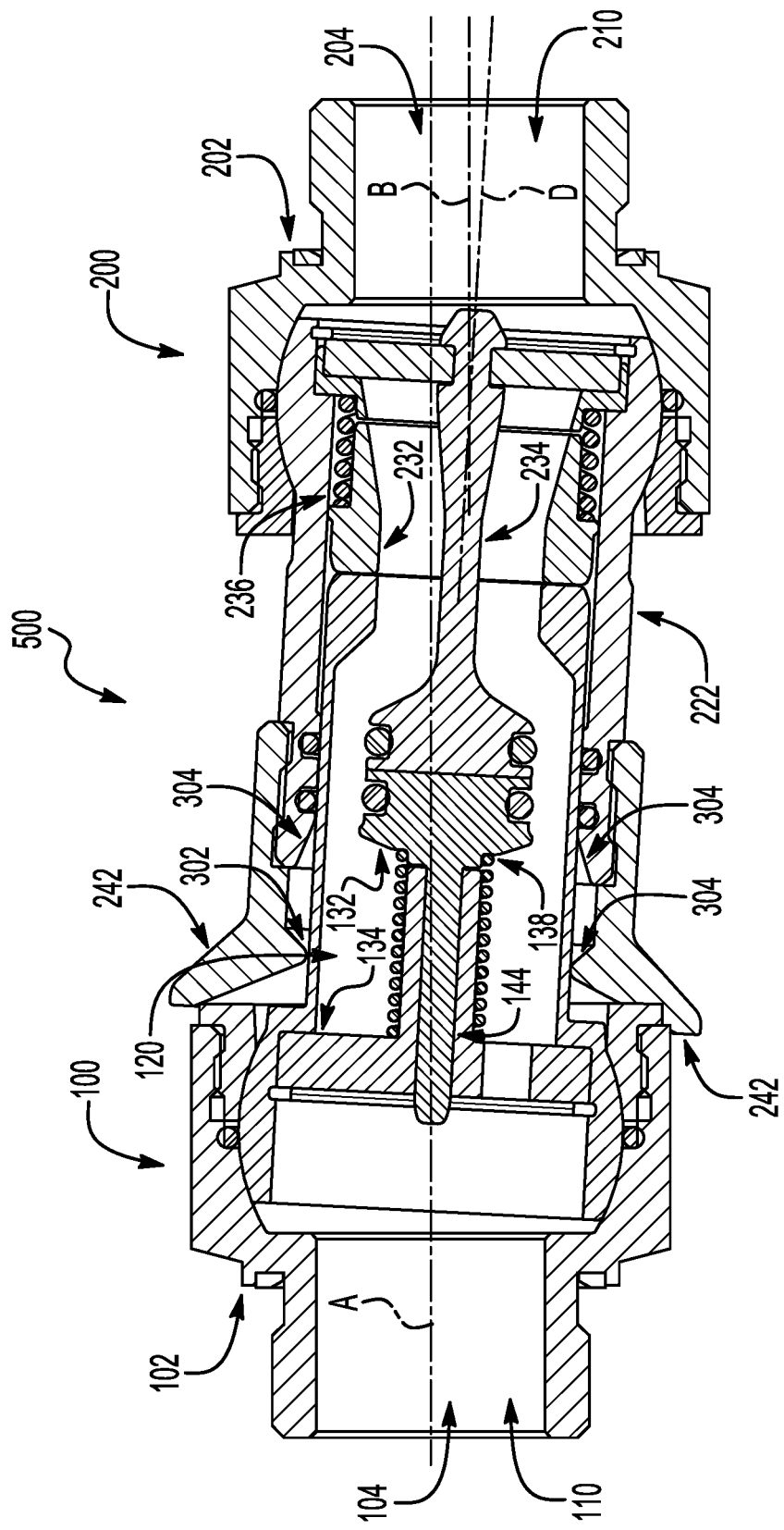

Turning now to FIGS. 3-5, illustrated is an exemplary process of the coupling together coupling member 100 and coupling member 200 where each coupling member is radially fixed and angularly pivotable. The illustrated coupling in FIGS. 3-5 provide benefits over conventional systems. For instance, by using cylindrical surfaces for the interface between coupling member 100 and coupling member 200, the illustrated coupling makes it easier to provide redundant seals on the female half of the seal that engages an outside of the male nipple. Additionally, the cylindrical surfaces provide a more reliable seal between coupling member 100 and coupling member 200 and, further, makes redundant seals possible.

In a first position 300, illustrated in FIG. 3, the nose 120 of coupling member 100 is aligned with and inserted into the enlarged opening 244 of the centering attachment 242 of coupling member 200. The sloped surface 246 of the centering attachment 242 further forms a protrusion 302 that engages and guides the nose 120 during the illustrated coupling process. Similar to the sloped surface 246 of the centering attachment, the entrance of the receptacle 222 can include a sloped surface 304 that engages the nose 120 of coupling member 100 to align the nose 120 of coupling member 100 and the receptacle 222 of coupling member 200. Here the sloped surface 246 and/or the sloped surface 304 are shaped to align an end of the stem 132 and an end of the stem portion 234, as can be seen in FIG. 4.

In a second position 400, illustrated in FIG. 4, the nose 120 has been further inserted into coupling member 200 and the sloped surface 246, the protrusion 302, and/or the sloped surface 304 have aligned the end of the stem 132 and the end of the stem portion 234. By aligning the end of the pin 123 and the end of the stem portion 234, the second position 400 further results in aligning longitudinal axis B and longitudinal axis D.

As can be seen more clearly in FIG. 4, in one embodiment, the cross-section at the end of the nose 120 and the cross-section at a forward end of the valve sleeve 232 are substantially similar and engage one another in position 400 to align the end of the stem 132 and the end of the stem portion 234. Similarly, the cross-section of the end of the stem 132 and the cross-section of the end of the stem portion 234 are substantially similar. However, different cross-sections may be employed in different configurations while still maintaining the above-described characteristics. As can be further seen in FIG. 4, in position 400, an outer surface of the nose 120 engages the O-ring 248 to sealingly engage an interface between the outer surface of the nose 120 and an inner surface of the valve body 206.

Turning now to FIG. 5, in a third position 500, the nose 120 is further inserted into coupling member 200 which causes the valve member 130 of coupling member 100 and/or the valve member 230 of coupling member 200 to move from the closed position (seen in FIGS. 3 and 4) to an open position. In the illustrated embodiment, both the valve 130 and the valve 230 are moved from the closed position to the opened position in the illustrated third position 500. More particularly, the stem portion 234 is fixed within coupling member 200, further movement of the nose 120 into coupling member 200 causes the stem portion 234 to drive the stem 132 into the sleeve portion 144 against the bias of biasing member 138 which causes a compression of the biasing member 138.

Similarly, because the nose 120 is a rigid structure, the end of the nose 120 is fixed with respect to the housing 102, and further movement of the nose 120 into coupling member 200 causes the engaged valve seal 232 to travel rearward in the valve body 206 against the bias of biasing member 236 which causes a similar compression of the biasing member 236. By moving both the valve member 130 of coupling member 100 and the valve member 230 of coupling member 200, the third position 500 places the fluid connector 104 of the coupling element 100 (and by extension the connected system) in fluid communication with the fluid connector 204 of the coupling element 200 (and by extension the second connected system).

Because the valve body 106 of coupling member 100 and valve body 206 of coupling member 200 can be angularly pivoted while maintaining fluid communication with their respect fluid connectors 104 and 204, the illustrated coupling connection can be employed even when the fluid connector 104 and the fluid connector 204 are not perfectly aligned with another, such as when longitudinal axis A is spaced radially from longitudinal axis C. Moreover, the above described angularly pivotable coupling members permit fluid connection even when the fluid connector 104 and the fluid connector 204 are not parallel, such as when longitudinal axis C is angled with respect to longitudinal axis A. Furthermore, by having angularly pivotable valve bodies 106 and 206 with respect to their respective housings 102 and 202, the illustrated coupling arrangement also facilitates radial misalignment compensation.

Figure 6:
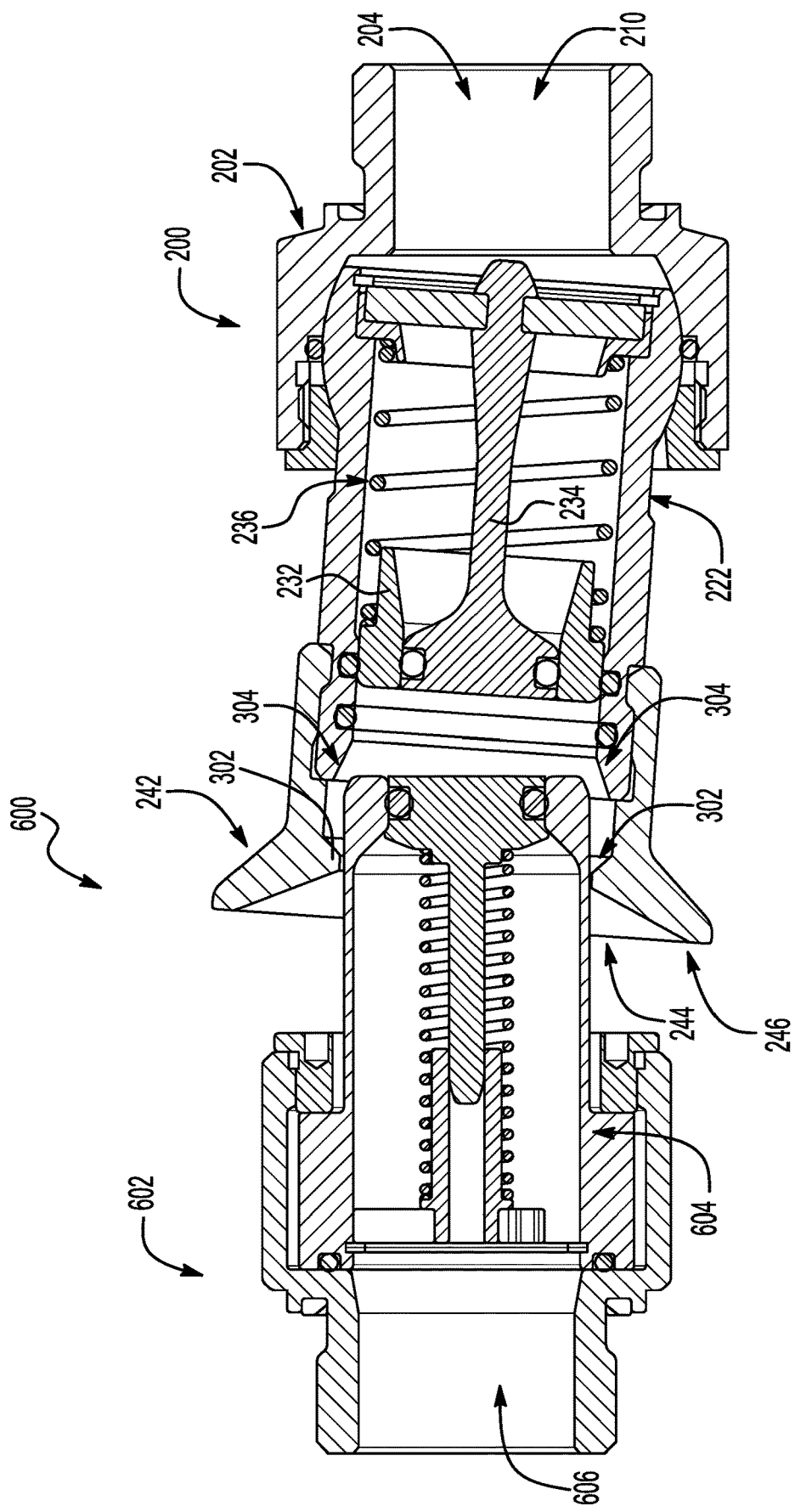
FIG. 6 illustrates another exemplary blind mate coupling that includes the female coupling member of FIG. 2.

The above-described coupling members 100 and/or 200 are not limited to the coupling connection shown in FIGS. 3-5 and may be used with differently configured coupling members. For instance, FIG. 6 illustrates an embodiment of a blind mate coupling 600 where a first coupling member is radially fixed and angularly pivotable and the second coupling member is angularly fixed and radially movable to allow for both radial and angular misalignment. More particularly, the illustrated blind mate coupling 600 includes the coupling member 200 and a coupling member 602 configured to allow different movement of a male protrusion 604 relative to a fluid connector 606, namely radial movement, similar to U.S. Application No. 63/289,251, incorporated by reference. In the illustrated embodiment, the female coupling member allows for angular pivoting of the valve body relative to a fluid connection while the male coupling member allows for radial pivoting of the valve body relative to a fluid connection, but the configuration may be vice-versa where the male coupling member is configured for angular pivoting and the female coupling member is configured for radial displacement.

The blind mate coupling 600 allows for connection between coupling members when coupling member 200 and coupling member 602 are radially offset from one another. Namely, the male protrusion 604 radially floats within a housing 608 to allow the male protrusion 604 to radially move with respect to the fluid connector 606 to account for the radial offset between the coupling member 200 and the coupling member 602. In the illustrated embodiment, as the male coupling member 602 is attached to the female coupling member 200, the male protrusion 604 travels downward with respect to the fluid connector 606 to align with the fluid connector 204 of the female coupling member 200. By using one radial pivoting coupling member and one angular pivoting coupling member, the blind mate coupling 600 accounts for both angular and radial misalignment.

Figure 7:
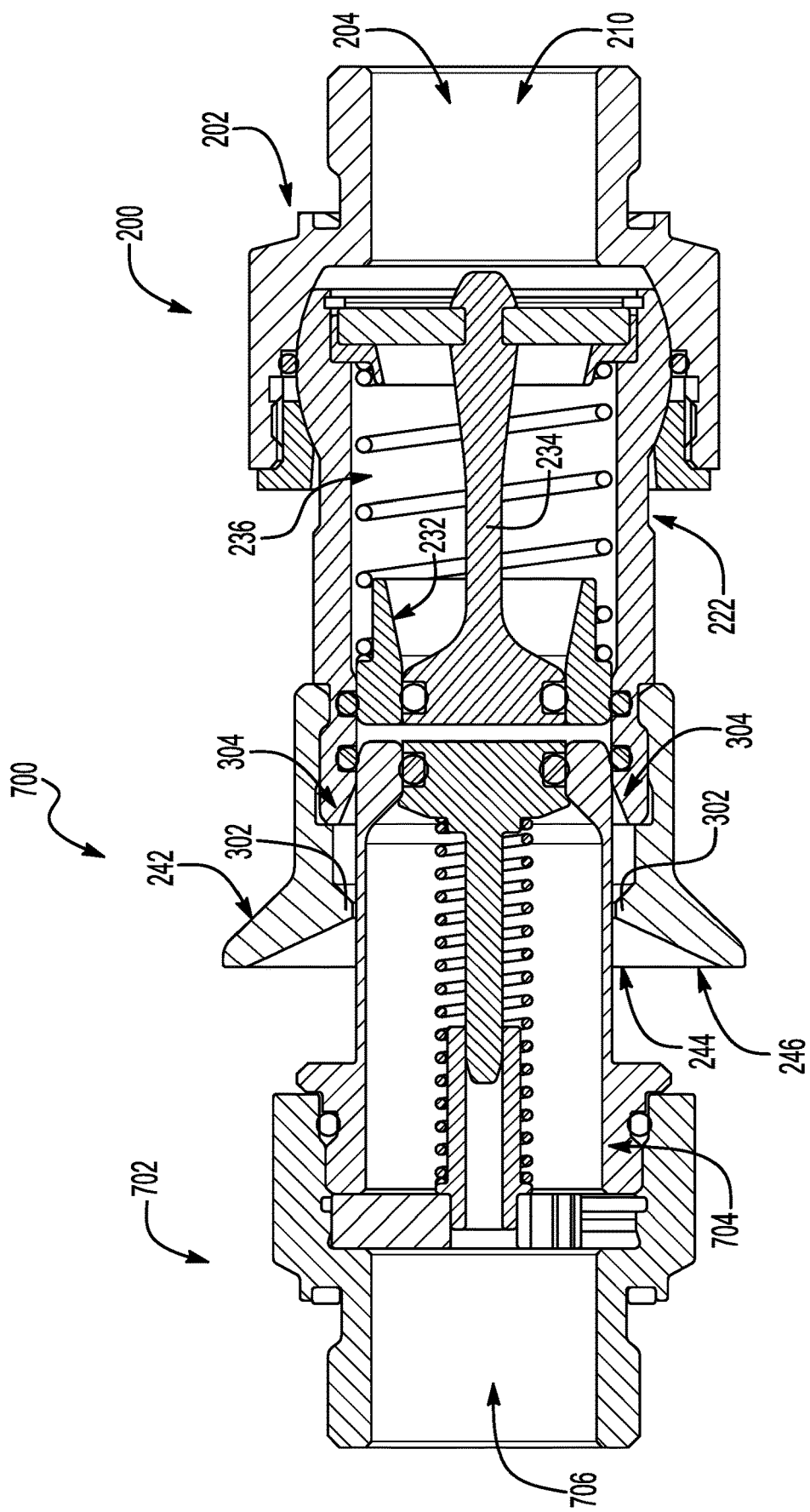
FIG. 7 illustrates a further exemplary blind mate coupling that includes the female coupling member of FIG. 2.

Turning now to FIG. 7, illustrated is another embodiment of a blind mate coupling 700 where a first coupling member is radially fixed and angularly pivotable and the second coupling member is fixed angularly and radially to allow for angular misalignment. More particularly, the illustrated blind mate coupling 700 includes the coupling member 200 and a coupling member 702 where a male protrusion 704 is fixed relative to a fluid connector 706. The coupling member 702 includes a valving structure similar to the above-described male coupling member 100 except the valve body 708 is fixed within the housing 710. The use of angular pivoting on one of the coupling members, here the female coupling member 200, allows for angular misalignment between the valve body 708 and the receptacle 222, but does not account for radial misalignment of the valve body 708 and the receptacle 222. In the illustrated embodiment, the female coupling member is angularly pivotable while the male coupling member is fixed but may be vice-versa where the female coupling member is fixed and the male coupling member is angularly pivotable.

Figure 8:
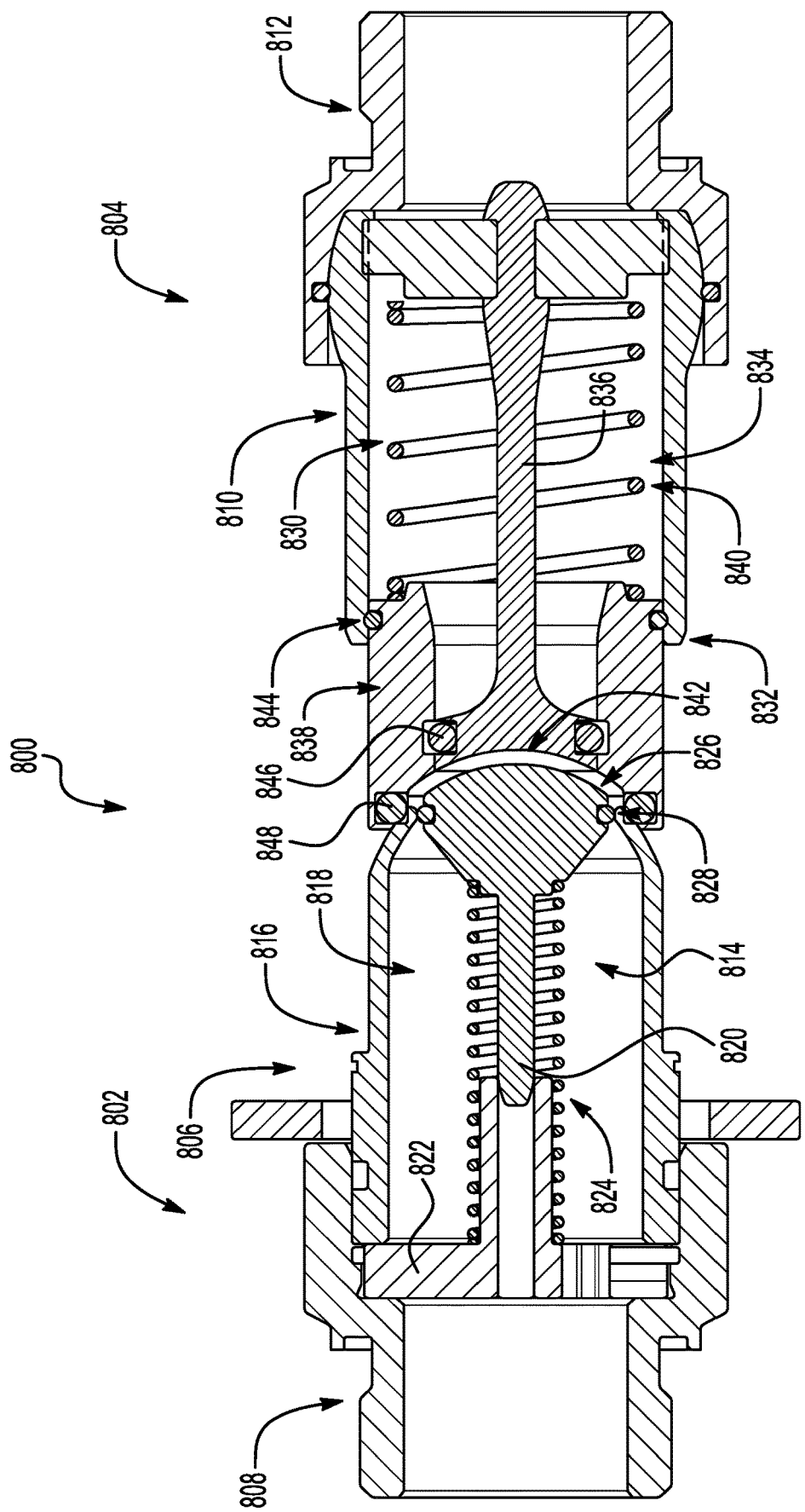
FIG. 8 illustrates an exemplary blind mate coupling.

Turning now to FIG. 8, illustrated is another blind mate coupling 800 where each coupling member is radially fixed and angularly pivotable that allows for angular and radial misalignment between a first coupling member 802 and a second coupling member 804. In contrast to both coupling members being angularly pivotable relative to their respective housings (e.g., the coupling illustrated in FIG. 3), the embodiment in FIG. 8 has only one of the coupling members (e.g., the female coupling member 804) that is angularly pivotable with respect to a housing. In addition, in contrast with a non-spherical sealing interface between the coupling members, the coupling 800 in FIG. 8 has a spherical interface between the coupling members. In the illustrated embodiment, the first coupling member 802 is a male coupling member and a valve body 806 is fixed with respect to a housing 808 and the second coupling member 804 is a female coupling member and a valve body 810 is angularly pivotable with respect to a housing 812. However, the configuration may be reversed with the male coupling member being angularly pivotable while the female coupling member is fixed.

Instead of flat surfaces aligning and pressing on one another, as in the embodiments described above, in the illustrated blind mate coupling 800 a spherical interface is employed to provide for different angled interfaces while still allowing for the movable valve members described above with respect to FIGS. 1 and 2. Similar to the embodiments described above, the illustrated blind mate coupling 800 allows for both radial and angular misalignment between the first coupling member 802 and the second coupling member 804. However, instead of the valve body 806 pivoting with respect to the housing 808, the end of the valve body 810 slides to different positions on the male protrusion of the first coupling member 802 based on the position of the housing 808 and/or the housing 812.

More particularly, the first coupling member 802 includes a valve member 814 within a protrusion 816 formed by the valve body 806 movable between a closed position (illustrated) and an open position to selectively prevent/allow access to an internal fluid passage 818 within the valve body 806. The valve member 814 includes a movable pin 820, a guide structure 822 configured to selectively retain a portion of the pin 820, and a biasing member 824 (e.g., a spring) configured to bias the pin 820 in the closed direction. An end of the pin 820 includes an outwardly spherical surface 826 configured to engage a corresponding surface 842 on the second coupling member 804. The end of the protrusion 816 is similarly outwardly spherical such that in combination with the outwardly spherical surface 826 at the end of the pin 820, the end of the first coupling member 802 is hemispherical. The first coupling member 802 further includes a seal structure configured to seal an interface between the pin 820 and the end of the protrusion 816. In the illustrated embodiment, the pin 820 includes a notch with an O-ring 828 therein to seal the interface.

The second coupling member 804 includes a valve member 830 within a receptacle 832 formed by the valve body 810 movable between a closed position (illustrated) and an open position to selectively prevent/allow access to an internal fluid passage 834 within the valve body 810. Here the valve member 830 extends outward from the valve body 810 to selectively engage the protrusion 816 of the first coupling member 802. The valve member 830 includes a fixed valve stem pin 836 and a movable valve sleeve 838 that engages the stem pin 836 in the closed position. The valve member 830 further includes a biasing member 840 configured to bias the valve sleeve 838 into the closed position. An end of the stem pin 836 forms an inwardly curving surface 842 shaped to engage the outward spherical surface 826. In the illustrated embodiment, the inwardly spherical surface 842 is shaped to slide across the outwardly spherical surface 826 to allow for different angles of engagement. Similar to the end of the protrusion 816, the end of the valve sleeve 838 is similarly inwardly spherical such that in combination with the inwardly spherical surface 842, the end of the second coupling member 804 is concave, comprising an inward extending dome to receive a spherical end of the first coupling member 802. In the illustrated embodiment, the end of the first coupling member 802 is a portion of a sphere (e.g., hemispherical).

The second coupling member 804 includes a first sealing arrangement for sealing an interface between the valve sleeve 838 and the valve body 810. The first sealing arrangement is further configured to permit the valve sleeve 838 to move along the valve body 810 while also maintaining the sealing interface therebetween. The illustrated first sealing arrangement includes an O-ring 844 in a notch in the valve sleeve 838.

The second coupling member 804 further includes a second sealing arrangement for sealing an interface between the stem pin 836 and the valve sleeve 838 in the closed position. In the illustrated embodiment, the second sealing arrangement includes a notch formed in the stem pin 836 and an O-ring 846 is placed in the notch to sealing engage the stem 836 and the valve sleeve 838 in the closed position.

The coupling 800 further includes a sealing arrangement configured to seal an interface between the first coupling member 802 and the second coupling member 804. The sealing arrangement is further configured to engage different portions of the first coupling member 802 and/or the second coupling member 804 for the different engagement angles between the valve body 806 of the first coupling member 802 and the valve body 810 of the second coupling member 804. In the illustrated embodiment, the valve sleeve 838 includes an O-ring 848 that engages an outer surface of the protrusion 816.

Figure 9A:
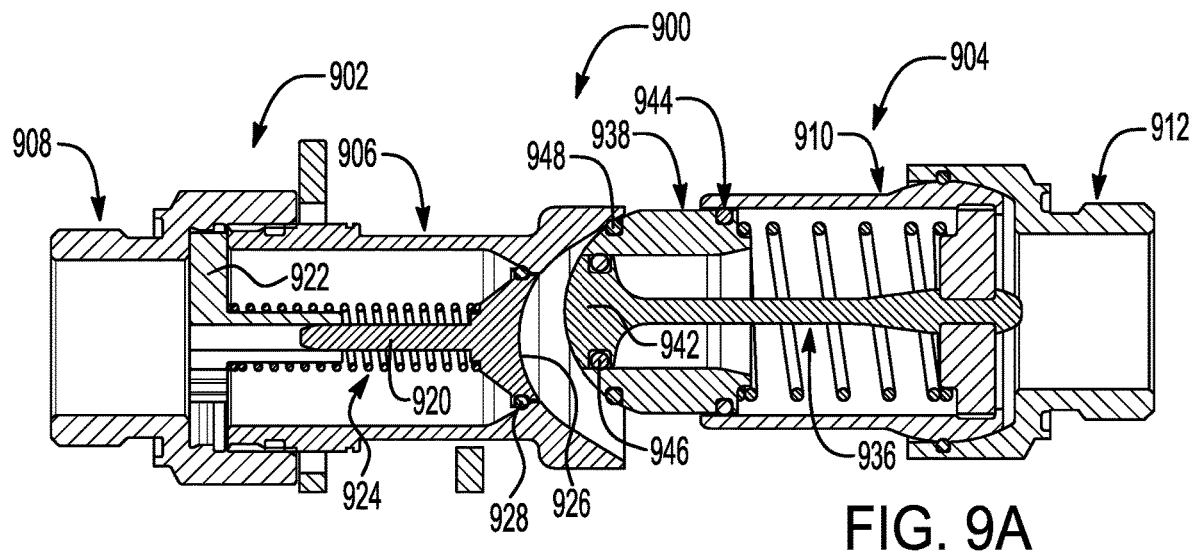
FIGS. 9A-9C illustrate an exemplary process of fluidly coupling a blind mate coupling.
Figure 9B:
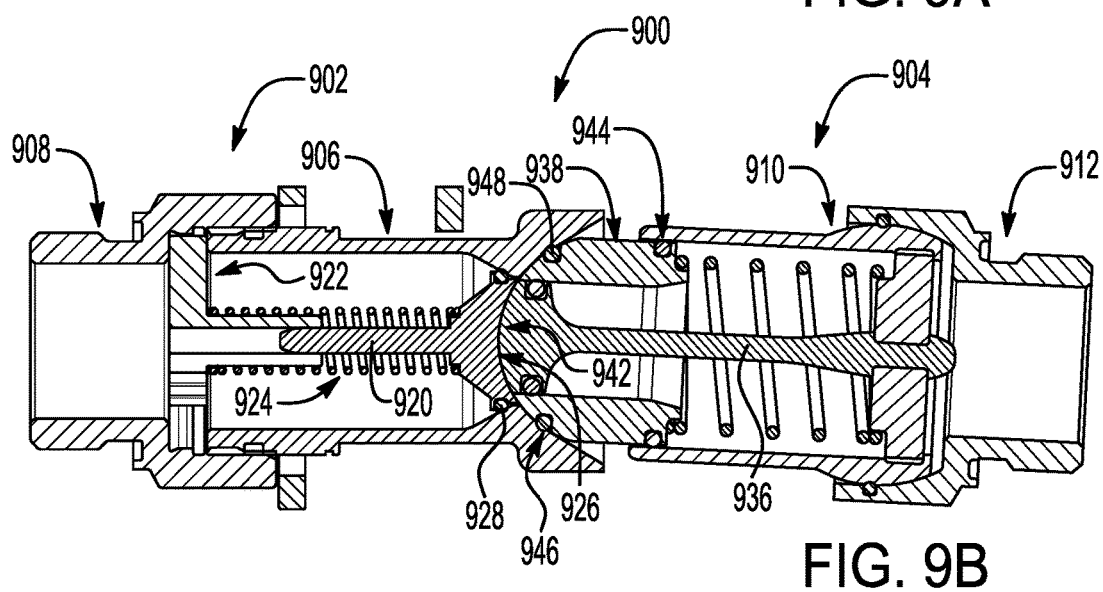
Figure 9C:
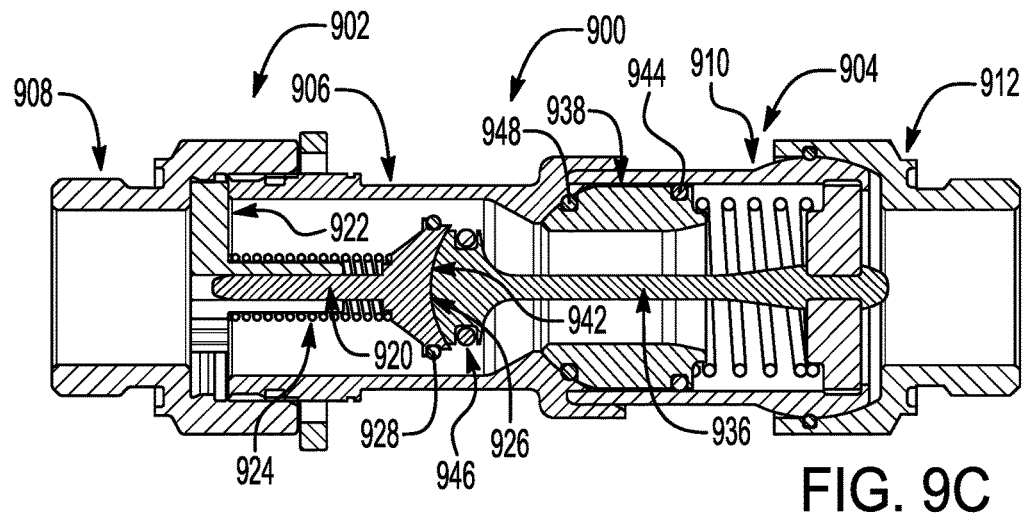

Turning now to FIGS. 9A-9C, illustrated is an embodiment of connecting a blind mate coupling 900 where each coupling member is radially fixed and angularly pivotable with a spherical interface between the coupling members to permit both angular and radial displacement. The blind mate coupling 900 includes a first coupling member 902 and a second coupling member 904 similar to the coupling members described above with reference to FIG. 8, except that a surface 926 of the pin 920 is concave and extends inwardly while the surface 942 of the stem pin 936 extends outwardly. To simplify explanation, similar numbers are used to describe the features in FIGS. 9A-9C as those in FIG. 8, except the 8 is replaced with a 9 for each number. As can be seen in FIG. 9A, the end of the second coupling member 904 is an outwardly extending hemi-spherical surface and the end of the first coupling member 902 is an inwardly extending dome configured to receive the hemi-spherical end of the second coupling member 902.

In the position illustrated in FIG. 9B, the hemi-spherical end of the second coupling member 904 is inserted into the inwardly extending dome of the first coupling element 902. In the illustrated position, the outwardly extending surface 942 of the stem pin 936 engages a portion of the inwardly extending surface 926 of the pin 920. Moreover, the valve sleeve 938 engages an inner surface of the end of the protrusion 916 and the O-ring 948 engages similarly engages the inner surface of the end of the protrusion 916 to sealingly engage the interface between the valve sleeve 938 and the protrusion 916.

In the position illustrated in FIG. 9C, the second coupling member 902 is further moved with respect to the first coupling member 902 which causes the valve member 914 of the first coupling member 902 and/or the valve member 930 of the second coupling member 904 to move to an open position that in turn places the first coupling member 902 and the second coupling member 904 in fluid communication. More particularly, the stem pin 936 causes the pin 920 to move rearward into the guide structure 922 against the bias of the biasing member 924. Furthermore, the end of the protrusion 916 causes the valve sleeve 938 to move rearward away from the stem pin 936 against the bias of the biasing member 940. Accordingly, the internal fluid passage 918 of the first coupling member 902 and the internal fluid passage 934 are placed in fluid communication with one another.

Figure 10:
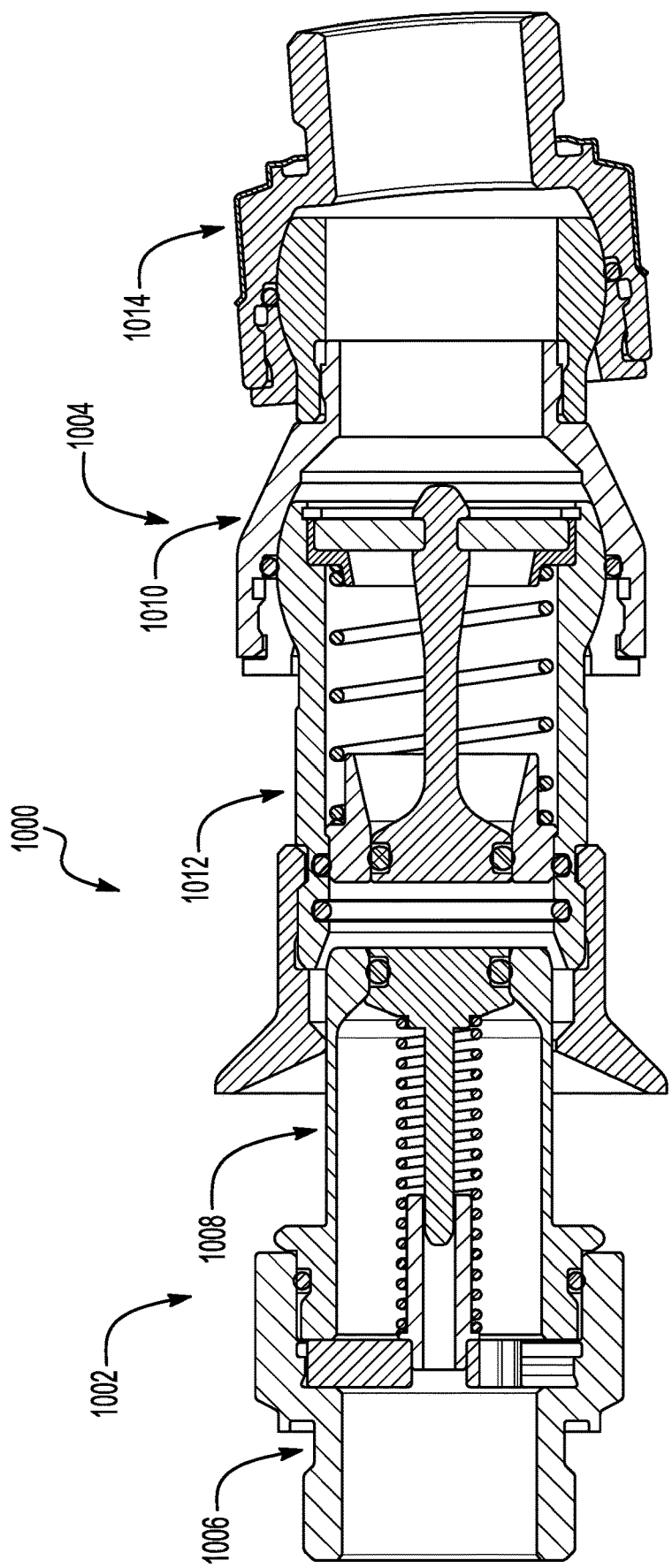
FIG. 10 illustrates another exemplary blind mate coupling.

The coupling member configurations described above can be further combined to form several angularly pivotable connections in a single coupling member. This arrangement can be used to increase a total pivoting range of the coupling member by combining a plurality of pivoting components arranged sequentially. Illustrated in FIG. 10 is an exemplary blind mate coupling 1000 with a first coupling element 1002 and a second coupling element 1004 and an interface arrangement where a first interface of the interface arrangement is configured to permit angular pivoting at the first interface and a second interface of the interface arrangement is configured to permit angular pivoting at the second interface or to permit radial movement at the second interface to enable angular misalignment between the first coupling member and the second coupling member and radial misalignment between the first coupling member and the second coupling member . In the illustrated embodiment, the first coupling element 1002 includes a housing 1006 and a valve body 1008 fixedly attached to that housing 1006. The second coupling element 1004 includes a plurality of angularly pivotable components to increase a total pivoting range of the second coupling element 1004. More particularly, the second coupling element 1004 includes a first housing component 1010 and a valve body 1012 (similar to the valve body 206 described above with respect to FIG. 2) movably retained in the first housing component 1010 while maintaining fluid communication therebetween and configured to angularly pivot with respect to the first housing component 1010. As noted above with respect to FIG. 7, the use of angular pivoting on one of the coupling members while the other coupling member is fixed, allows for angular misalignment between the valve body 1008 and the valve body 1012, but does not account for radial misalignment of the valve body 1008 and the receptacle 1012. Accordingly, a second housing component 1014 is added to the second coupling element 1004. A portion of the first housing component 1010 is movably retained within the second housing component 1014 while maintaining fluid communication therebetween. In the illustrated embodiment, the first housing component 1010 can angularly pivot with respect to the second housing 1014. In another embodiment, the first housing component 1010 can be radially and angularly displaceable with respect to the second housing 1014.

According to an aspect of the disclosure, a blind mate coupling comprises: a first coupling member including: a first housing; a first fluid connector configured to connect to a first fluid conduit, the first fluid connector being fixed in position relative to the first housing; and a first valve body at least partially extending in the first housing, wherein the first valve body has a first internal fluid passage that is fluidly connected to the fluid connector, wherein the first valve body is radially fixed with respect to the first housing, wherein the first valve body is angularly pivotable with respect to the first housing; and a second coupling member including; a second housing; a second fluid connector configured to connect to a second fluid conduit, the second fluid connector being fixed in position relative to the second housing; and a second valve body at least partially extending in the second housing, wherein the second valve body has a second internal fluid passage that is fluidly connected to the second fluid connector, wherein the second valve body is angularly pivotable with respect to the second housing for enabling angular misalignment between the first coupling member and the second coupling member or radially movable with respect to the second housing for enabling radial misalignment between the first coupling member and the second coupling member.

Exemplary embodiments may include one or more of the following additional features, separately or in any combination.

In exemplary embodiment(s), the second valve body is radially fixed with respect to the second housing, wherein the second valve body is angularly pivotable with respect to the second housing.

In exemplary embodiment(s), the second valve body is pivotably fixed with respect to the second housing, wherein the second valve body is radially movable with respect to the second housing.

In exemplary embodiment(s), the first valve body has a spherical interface that interfaces with the first housing for enabling angular pivoting of the first valve body with respect to the first housing.

In exemplary embodiment(s), the spherical interface is in the first housing such that the internal fluid passage is angularly pivotable with respect to the fluid connector.

In exemplary embodiment(s), an internal surface of the first housing includes a housing spherical interface configured to interface with the spherical interface of the first valve body to permit angular pivoting of the internal fluid passage relative to the fluid connector.

In exemplary embodiment(s), further comprising a seal arrangement configured to seal an interface between the first housing and the spherical interface of the first valve body, wherein the seal arrangement is configured to permit angular displacement of the first valve body relative to the first housing.

In exemplary embodiment(s), a first portion of the internal fluid passage extends through the spherical interface of the first valve body, wherein a second portion of the internal fluid extends through a portion of the valve body axially forward of the spherical interface, wherein the first portion has a first cross-section, wherein the second portion has a second cross-section smaller than the first cross-section.

In exemplary embodiment(s), at least one of the spherical interface, the first housing, or the first valve body defines an angular pivotable range the internal fluid passage relative to the fluid connector.

In exemplary embodiment(s), a first end of the first valve body is in the first housing, wherein the spherical interface is at a second end of the first valve body opposite the first end.

In exemplary embodiment(s), further comprising a seal arrangement configured to seal an interface between the second coupling member and the spherical interface of the valve body In exemplary embodiment(s), the first valve body is fixed within the first housing.

In exemplary embodiment(s), further comprising a valve member at least partially disposed in the internal fluid passage, wherein the valve member is movable relative to the first valve body to open or close the internal fluid passage.

In exemplary embodiment(s), a head of the valve member is spherically shaped.

According to another aspect of the disclosure, a blind mate coupling comprising: a first coupling member including: a first housing; a first fluid connector configured to connect to a first fluid conduit, the first fluid connector being fixed in position relative to the first housing; and a first valve body at least partially extending in the first housing, wherein the first valve body has a first internal fluid passage that is fluidly connected to the fluid connector, wherein the valve body further has a spherical interface; and a second coupling member including; a second housing; a second fluid connector configured to connect to a second fluid conduit, the second fluid connector being fixed in position relative to the second housing; and a second valve body at least partially extending in the second housing, wherein the second valve body has a second internal fluid passage that is fluidly connected to the second fluid connector, wherein the second valve body is movable relative to the second housing to move the second internal fluid passage relative to the second fluid connector, wherein the spherical interface of the first valve body interfaces with at least one of the housing or another coupling member for enabling angular misalignment between the first coupling member and the second coupling member.

Exemplary embodiments may include one or more of the following additional features, separately or in any combination.

In exemplary embodiment(s), the second valve body is configured to be angularly pivotable relative to the second housing to angularly pivot the second internal fluid passage relative to the second fluid connector.

In exemplary embodiment(s), the second valve body includes a second spherical interface configured to interface with the spherical interface of the first valve body to fluidly connect the first internal fluid passage and the second internal fluid passage.

In exemplary embodiment(s), further comprising a seal arrangement configured to seal an interface between the first valve body and the second valve body.

In exemplary embodiment(s), the first coupling member is a male member, wherein the second coupling member is a female member, wherein the second valve body forms a receptacle configured to receive a forward end of the first valve body of the first coupling member.

In exemplary embodiment(s), the second valve body is radially movable relative to the second housing.

According to a further aspect of the disclosure, A coupling member comprising: a housing; a fluid connector configured to connect to a fluid conduit, the fluid connector being fixed in position relative to the housing; a valve body at least partially extending in the housing at a first end, wherein the valve body has an internal fluid passage that is fluidly connected to the fluid connector, wherein the valve body forms a receptacle configured to receive a forward end of another coupling member, wherein the valve body includes a spherical interface at a second end opposite the first end, wherein the spherical interface enables angular misalignment between the coupling member and the another coupling member.

Exemplary embodiments may include one or more of the following additional features, separately or in any combination.

In exemplary embodiment(s), the valve body further includes a second spherical interface that interfaces with the housing to be angularly pivotable with respect to the housing to permit the internal fluid passage to angularly pivot with respect to the fluid connector.

In exemplary embodiment(s), the spherical interface is a concave spherical interface that extends inwardly from the second end of the valve body.

According to yet another aspect of the disclosure, a coupling member for a blind mate fluid coupling comprises a housing; a fluid connector configured to connect to a fluid conduit, the fluid connector being fixed in position relative to the housing; and a valve body at least partially extending in the housing, wherein the valve body has an internal fluid passage that is fluidly connected to the fluid connector, wherein the valve body further has a spherical interface that interfaces with at least one of the housing or another coupling member for enabling angular misalignment between the coupling member and the another coupling member.

According to a yet further aspect of the disclosure, a blind mate fluid coupling comprises a first coupling member; a second coupling member; and an interface arrangement configured to fluidly couple the first coupling member and the second coupling member, wherein a first interface of the interface arrangement is configured to permit angular pivoting at the first interface, wherein a second interface of the interface arrangement is configured to permit angular pivoting at the second interface or to permit radial movement at the second interface to enable angular misalignment between the first coupling member and the second coupling member radial misalignment between the first coupling member and the second coupling member.

According to yet another aspect of the disclosure, a blind mate fluid coupling comprises a first coupling member comprising: a first housing; a first fluid connector configured to connect to a first fluid conduit, the first fluid connector being fixed in position relative to the housing; and a first valve body at least partially extending in the housing, wherein the first valve body has a first internal fluid passage that is fluidly connected to the fluid connector, wherein the first valve body is fixed within the first housing; a second coupling member comprising: a second housing; a second fluid connector configured to connect to a second fluid conduit, the second fluid connector being fixed in position relative to the housing; and a second valve body at least partially extending in the second housing, wherein the second valve body has a second internal fluid passage that is fluidly connected to the second fluid connector, wherein the second valve body further has a spherical interface that interfaces with the second housing for enabling angular misalignment between the first coupling member and the second coupling member, wherein the first valve body includes a spring-biased flat surface configured to engage a second spring-biased flat surface of the second valve body to fluidly couple the first coupling member and the second coupling member.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:
1. A blind mate coupling comprising:
   a first coupling member including:
      a first housing;

a first fluid connector configured to connect to a first fluid conduit, the first fluid connector being fixed in position relative to the first housing; and a first valve body at least partially extending in the first housing, wherein the first valve body has a first internal fluid passage that is fluidly connected to the fluid connector, wherein the first valve body is radially fixed with respect to the first housing, and wherein the first valve body is angularly pivotable with respect to the first housing; and a second coupling member including;

a second housing;

a second fluid connector configured to connect to a second fluid conduit, the second fluid connector being fixed in position relative to the second housing; and a second valve body at least partially extending in the second housing, wherein the second valve body has a second internal fluid passage that is fluidly connected to the second fluid connector, wherein the second valve body is angularly pivotable with respect to the second housing for enabling angular misalignment between the first coupling member and the second coupling member or radially movable with respect to the second housing for enabling radial misalignment between the first coupling member and the second coupling member;

wherein the second valve body is pivotably fixed with respect to the second housing, wherein the second valve body is radially movable with respect to the second housing.

2. The blind mate coupling of claim 1, wherein the second valve body is radially fixed with respect to the second housing, wherein the second valve body is angularly pivotable with respect to the second housing.

3. The blind mate coupling of claim 1, wherein the first valve body further has a spherical interface that interfaces with the first housing for enabling angular pivoting of the first valve body with respect to the first housing.

4. The blind mate coupling of claim 3, wherein the spherical interface is in the first housing such that the internal fluid passage is angularly pivotable with respect to the fluid connector.

5. The blind mate coupling of claim 4, wherein an internal surface of the first housing includes a housing spherical interface configured to interface with the spherical interface of the first valve body to permit angular pivoting of the internal fluid passage relative to the fluid connector.

6. The blind mate coupling of claim 4, further comprising a seal arrangement configured to seal an interface between the first housing and the spherical interface of the valve body, wherein the seal arrangement is configured to permit angular displacement of the valve body relative to the housing.

7. The blind mate coupling of claim 4, wherein a first portion of the internal fluid passage extends through the spherical interface of the valve body, wherein a second portion of the internal fluid extends through a portion of the valve body axially forward of the spherical interface, wherein the first portion has a first cross-section, wherein the second portion has a second cross-section smaller than the first cross-section.

8. The blind mate coupling of claim 4, wherein at least one of the spherical interface, the first housing, or the first valve body defines an angular pivotable range the internal fluid passage relative to the fluid connector.

9. The blind mate coupling of claim 1, further comprising a valve member at least partially disposed in the internal fluid passage, wherein the valve member is movable relative to the valve body to open or close the internal fluid passage.

10. A blind mate coupling comprising:

a first coupling member including:

a first housing;

a first fluid connector configured to connect to a first fluid conduit, the first fluid connector being fixed in position relative to the first housing; and a first valve body at least partially extending in the first housing, wherein the first valve body has a first internal fluid passage that is fluidly connected to the fluid connector, wherein the valve body further has a spherical interface; and a second coupling member including;

a second housing;

a second fluid connector configured to connect to a second fluid conduit, the second fluid connector being fixed in position relative to the second housing; and a second valve body at least partially extending in the second housing, wherein the second valve body has a second internal fluid passage that is fluidly connected to the second fluid connector, wherein the second valve body is movable relative to the second housing to move the second internal fluid passage relative to the second fluid connector, wherein the spherical interface of the first valve body interfaces with at least one of the first housing or the second coupling member for enabling angular misalignment between the first coupling member and the second coupling member; and wherein the second valve body is radially movable relative to the second housing.

11. The blind mate coupling of claim 10, wherein the second valve body is configured to be angularly pivotable relative to the second housing to angularly pivot the second internal fluid passage relative to the second fluid connector.

12. The blind mate coupling of claim 10, wherein the second valve body includes a second spherical interface configured to interface with the spherical interface of the first valve body to fluidly connect the first internal fluid passage and the second internal fluid passage.

13. The blind mate coupling of claim 10, further comprising a seal arrangement configured to seal an interface between the first valve body and the second valve body, and wherein the first coupling member is a male member, wherein the second coupling member is a female member, wherein the second valve body forms a receptacle configured to receive a forward end of the first valve body of the first coupling member.

14. A coupling member comprising:

a housing;

a fluid connector configured to connect to a fluid conduit, the fluid connector being fixed in position relative to the housing;

a valve body at least partially extending in the housing at a first end, wherein the valve body has an internal fluid passage that is fluidly connected to the fluid connector, wherein the valve body forms a receptacle configured to receive a forward end of another coupling member, wherein the valve body includes a spherical interface at a second end opposite the first end, wherein the spherical interface enables angular misalignment between the coupling member and the another coupling member; and wherein the valve body further includes a second spherical interface that interfaces with the housing to be angularly pivotable with respect to the housing to permit the internal fluid passage to angularly pivot with respect to the fluid connector.

15. The coupling member of claim 14, wherein the spherical interface is a concave spherical interface that extends inwardly from the second end of the valve body.

* * * * *